United States Patent [19]

Liu

[11] Patent Number: 6,114,829
[45] Date of Patent: Sep. 5, 2000

[54] TRACTION SYSTEM IN VOLTAGE MODE INCLUDING POWER SUPPLY BUSES OF AN ELECTRIC TRACTION VEHICLE

[75] Inventor: Rong Fan Liu, Pau, France

[73] Assignee: Alstom Transport S.A., Paris, France

[21] Appl. No.: 09/236,558

[22] Filed: Jan. 26, 1999

[30] Foreign Application Priority Data

Jan. 26, 1998 [FR] France ................................. 98 00773

[51] Int. Cl.[7] ..................................................... H02P 5/34
[52] U.S. Cl. ........................... 318/801; 340/347; 356/345
[58] Field of Search ........................... 318/801; 340/347; 356/345

[56] References Cited

U.S. PATENT DOCUMENTS 3,893,104  7/1975  Furukawa et al. ...................... 340/347
5,283,625  2/1994  Bunn, Jr. ................................. 356/345

OTHER PUBLICATIONS

D. Schmidt, "Germany's Intercity Express with ABB Three–Phase Propulsion", *ABB Review*, No. 10, Jan. 1, 1991, pp. 3–10.

*Primary Examiner*—Karen Masih
*Attorney, Agent, or Firm*—Young & Thompson

[57] ABSTRACT

A traction system in voltage mode includes power supply buses of an electric traction vehicle, the power supply buses each including a 2F filter with the midpoints of the 2F filters being linked together.

2 Claims, 9 Drawing Sheets

TRACTION SYSTEM IN VOLTAGE MODE INCLUDING POWER SUPPLY BUSES OF AN ELECTRIC TRACTION VEHICLE

BACKGROUND OF THE INVENTION

The present invention relates to electric traction systems, in general, and relates, more particularly, to a traction system in voltage mode including power supply buses of an electric traction vehicle.

DESCRIPTION OF THE RELATED ART

In the field of electric traction systems, GTO (GATE TURN OFF) technology favours the use of electrical power layouts of an electric traction system including buses of the common-buses type.

IGBT (INSULATED GATE BIPOLAR TRANSISTOR) technology is likely to favour the implementation of electrical power layouts of an electric traction system including buses of the separate-buses type.

Electrical power layouts of an electric traction system of the prior art including buses of the common-buses type have the advantages that:

- all the traction power is shared among the forced-commutation single-phase bridges (PMCF from now on) on the same bus; there is therefore no overcurrent within the PMCFs in the event of dispersion in the traction powers from each inverter,
- in the case of a bus consisting of a number N of PMCFS, the interlacing of the N PMCFs makes it possible to minimize all the spectral lines from the family 1 to the family N−1, giving rise to a level of performance, from the point of view of the absence of oscillations on the catenary network, which is all the higher since the level of the value of the primary current IPE is assured,
- in the case of an isolated PMCF, the total starting force is still provided while complying with the quality of the interlacing of the remaining PMCFs.
- the auxiliary unit is easily installed on the DC bus.

Such electrical power layouts of an electric traction system of the prior art including buses of the common-buses type have the drawbacks that:

- a short-circuit of the common bus entails an excess torque on all the traction motors,
- because the commutation of the IGBTs needs a low circuit inductance, a short-circuit on all the capacitors of the common bus may give rise to an overcurrent phenomenon.

The electrical power layouts of an electric traction system of the prior art including buses of the type with separate buses per axle have the advantages that:

- in the event of a short-circuit on a bus, the overcurrent is minimized, and the excess torque of the motor is limited to a single inverter; there is therefore no influence on the other buses.

Such electrical power layouts of an electric traction system of the prior art including buses of the type with separate buses per axle have the drawbacks that:

- with the operation of each bus being independent, because of the dispersions in the measurements of the DC voltages and of the traction powers on each inverter, the quality of the interlacing of the N PMCFs on N separate buses cannot be assured; the harmonics and the value of the primary current IPE are therefore degraded.
- because of this same problem of the interlacing, the PMCFs have to be slightly over-dimensioned,
- the auxiliary units are difficult to install on the separate buses.

Table 1 below brings together all the performance aspects of the various electrical power layouts of an electric traction system of the prior art.

TABLE 1

| /PERFORMANCE CONFIGURATIONS | HARMONICS AND IPE | SHORT-CIRCUIT WITHSTAND | AVAILABILITY IN DEGRADED MODE |
|---|---|---|---|
| Common buses (per motive power unit) | Good | Poor | Good |
| Separate buses (per axle) | Poor | Good | Poor |
| Common buses per bogey | Average | Average | Average |

| continued | with HIGH-POWER AUXILIARY UNIT | INDEPENDENCE OF THE AXLES |
|---|---|---|
| Common buses (per motive power unit) | Good | Poor |
| Separate buses (per axle) | Poor | Good |
| Common buses per bogey | Poor | Average |

SUMMARY OF THE INVENTION

An object of the invention is an electric traction system including power supply buses of an electric traction vehicle exhibiting the advantages of traction systems including power supply buses of the common-buses type according to the prior art, as well as the advantages of traction systems including power supply buses of the separate-buses type according to the prior art.

Another object of the invention is an electric traction system including power supply buses of an electric traction vehicle not exhibiting the drawbacks of the electric traction systems according to the prior art.

Other object of the invention is an electric traction system including power supply buses of an electric traction vehicle in which the overall performance is improved.

In accordance with the invention, the traction system in voltage mode including power supply buses of an electric traction vehicle is as characterized below.

One advantage of the traction system in voltage mode including power supply buses of an electric traction vehicle of the invention is better performance of the powers as well as of the harmonics.

Other purposes, characteristics and advantages of the invention will emerge upon reading the description of the preferred embodiment of a traction system in voltage mode including power supply buses of an electric traction vehicle.

FIG. 1 is an electrical layout of an electric traction system including buses of the separate-buses type in accordance with the prior art, FIGS. 1A to 1D show, respectively, the levels of harmonics and the shape of the four secondary currents obtained by the electrical layout of FIG. 1, FIG. 2 is an electrical layout of an electric traction system including buses of the type with common buses per bogey in accordance with the prior art, FIGS. 2A to 2D show, respectively, the levels of harmonics and the shape of the four secondary currents obtained by the electrical layout of FIG. 2, FIG. 3 is an electrical layout of an electric traction system including buses of the common-buses type in accordance with the prior art, FIGS. 3A and 3B show, respectively, the levels of harmonics and the shape of the four secondary currents obtained by the electrical layout of FIG. 3, FIG. 4 is an electrical layout of a first preferred embodiment of an electric traction system including buses of the semi-common buses type in accordance with the invention.

Figure 1:
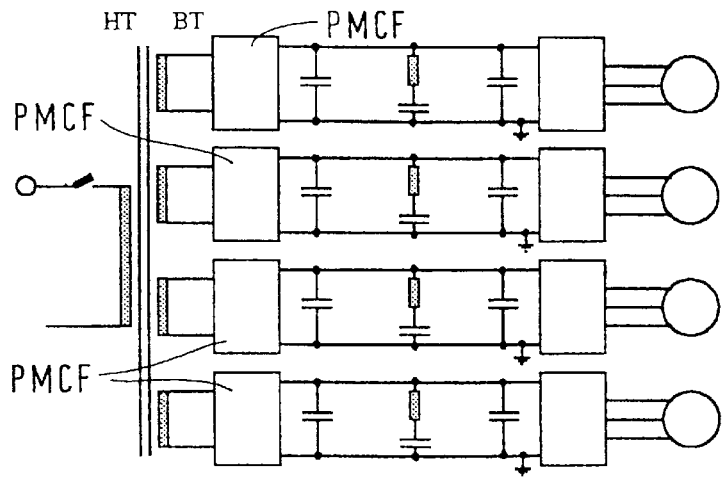
FIG. 1 is an electrical layout of an electric traction system including buses of the separate-buses type in accordance with the prior art.

This FIG. 1 shows a traction system with four buses, each bus including a PMCF and a 2F filter.

FIGS. 1A to 1D show, respectively, the levels of harmonics and the shape of the four secondary currents obtained by the electrical layout of FIG. 1 in normal operation with a PMCF at rest.

Figure 2:
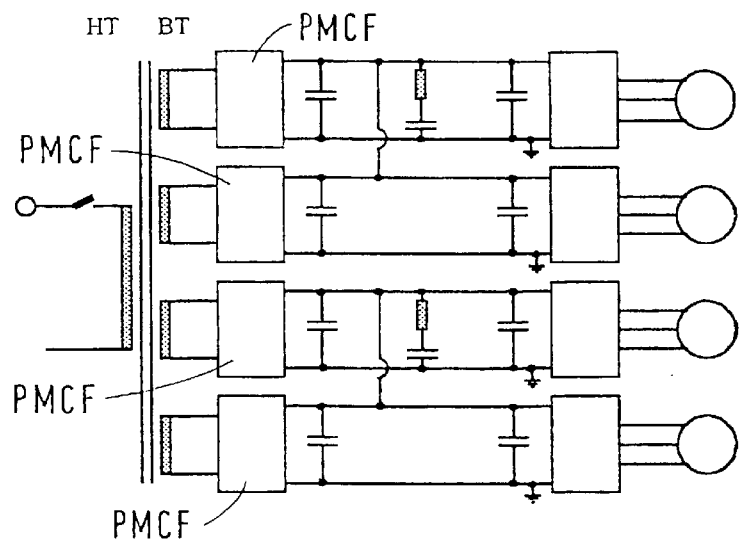

FIG. 2 is an electrical layout of an electric traction system including buses of the type with common buses per bogey in accordance with the prior art.

This FIG. 2 shows a traction system with four buses, each bus including a PMCF and a 2F filter, the buses being configured in pairs so that each pair of buses is associated with two PMCFs.

FIGS. 2A to 2D show, respectively, the levels of harmonics and the shape of the four secondary currents obtained by the electrical layout of FIG. 2, in normal operation with a motor stopped.

Figure 3:
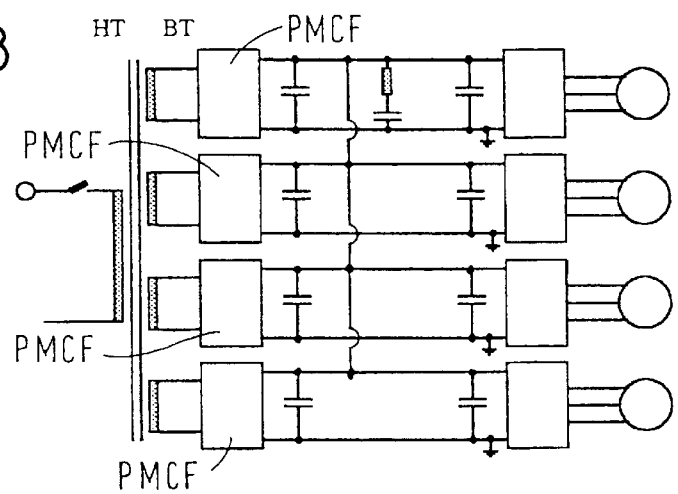

FIG. 3 is an electrical layout of an electric traction system including buses of the common-buses type in accordance with the prior art.

This FIG. 3 shows a traction system with four buses, each bus including a PMCF, only one of the buses including a 2F filter, the buses being configured in such a way that the set of buses are associated with the four PMCFs.

Figure 3A:
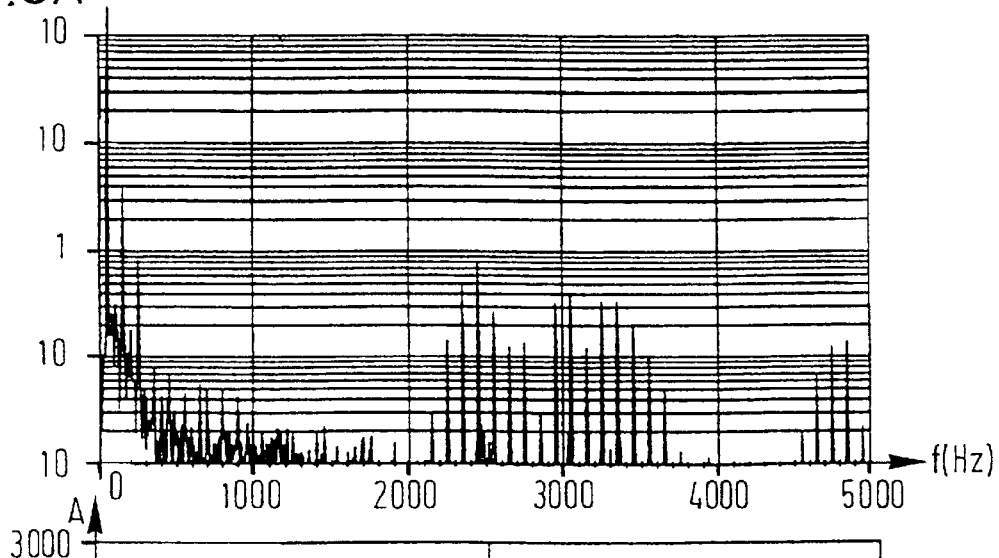
Figure 3B:
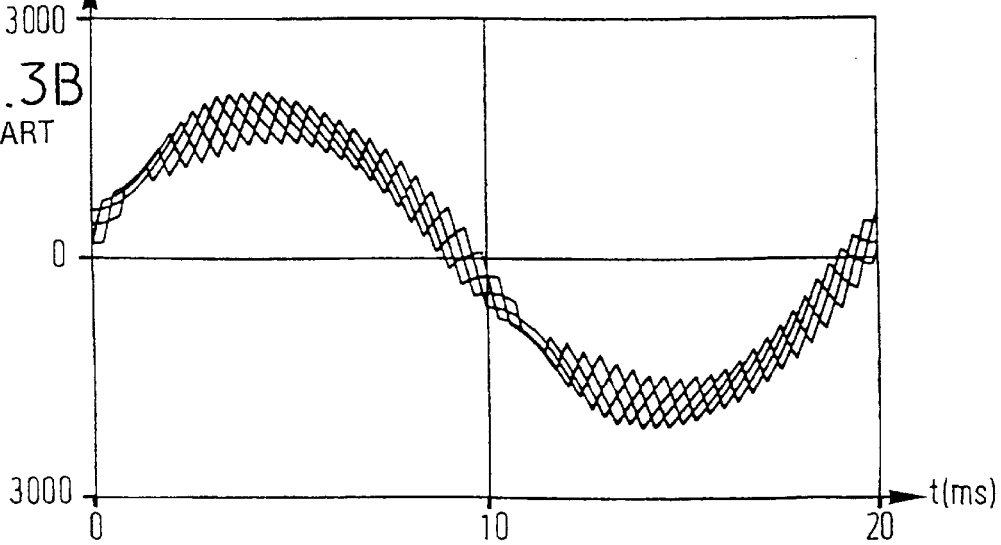

FIGS. 3A and 3B show, respectively, the levels of harmonics and the shape of the four secondary currents obtained by the electrical layout of FIG. 3.

DESCRIPTION OF THE PREFERRED EMBODIMENTS

Figure 4:
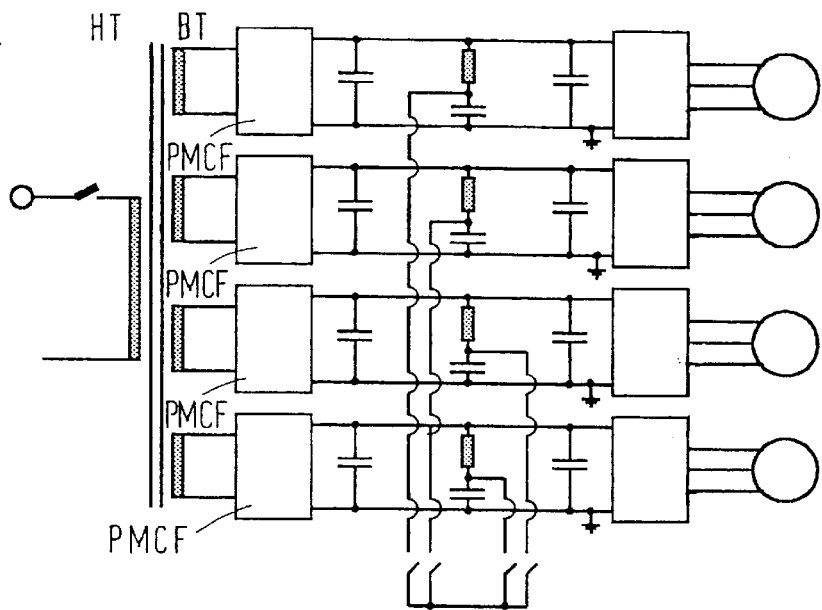
FIGS. 4A and 4B show, respectively, the levels of harmonics and the shape of the four secondary currents obtained by the electrical layout of FIG. 4.

FIG. 4 is an electrical layout of a first preferred embodiment of an electric traction system including buses of the semi-common buses type in accordance with the invention.

The traction system in voltage mode includes power supply buses of an electric traction vehicle.

The power supply buses each include a 2F filter the mid-points of which are linked together, preferably by means of switching elements.

Thus FIG. 4 shows a four-bus traction system, each bus including a PMCF and a 2F filter, the 2F filters being configured in such a way that the mid-points of the 2F filters of the set of power supply buses are linked together.

Figure 4A:
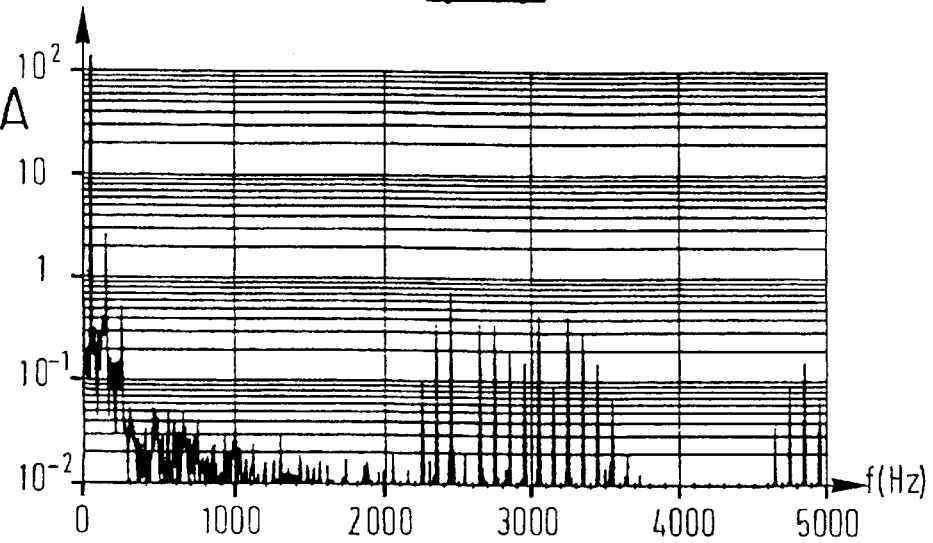
Figure 4B:
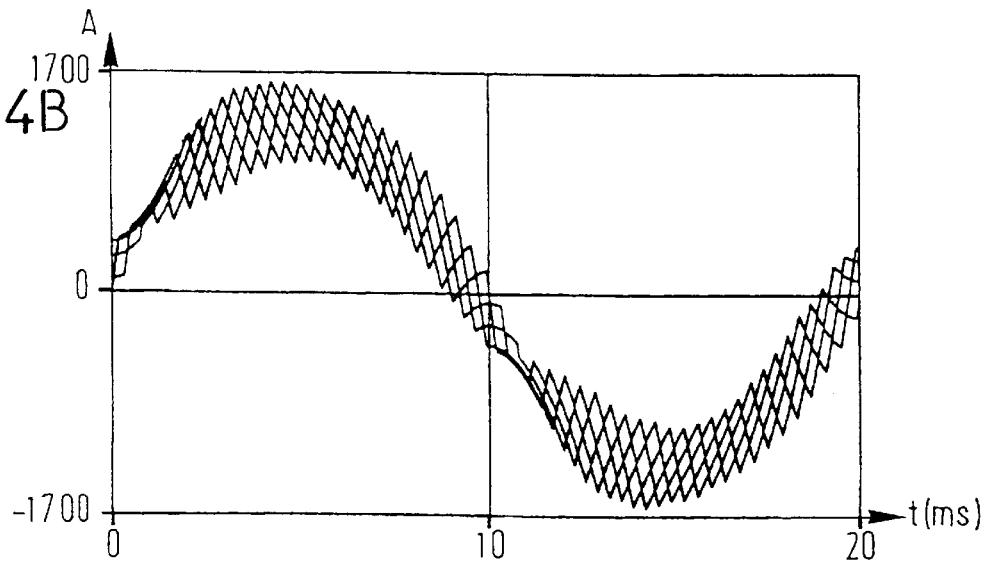

FIGS. 4A and 4B show, respectively, the levels of harmonics and the shape of the four secondary currents obtained by the electrical layout of FIG. 4.

Figure 5:
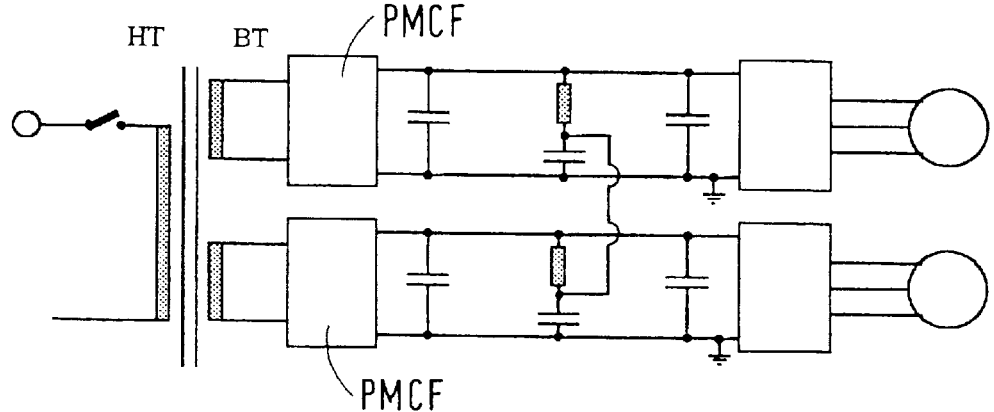
FIG. 5 is an electrical layout of another preferred embodiment of the electric traction system including two buses of the semi-common buses type in accordance with the invention.

FIG. 5 represents the electrical layout of the first preferred embodiment of the electric traction system including two buses of the semi-common buses type in accordance with the invention.

Figure 5A:
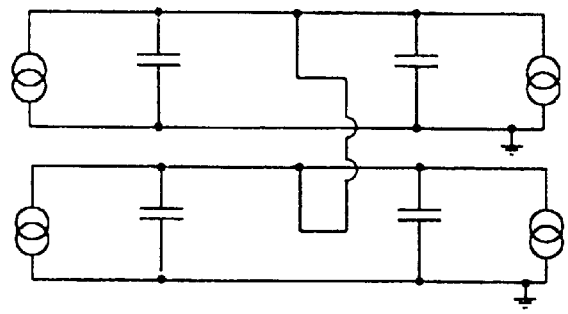
FIGS. 5A to 5C show, respectively, the equivalent layouts of the electrical layout of FIG. 5, in the case of direct currents, of 2F currents and of a short-circuit of the higher bus.
Figure 5B:
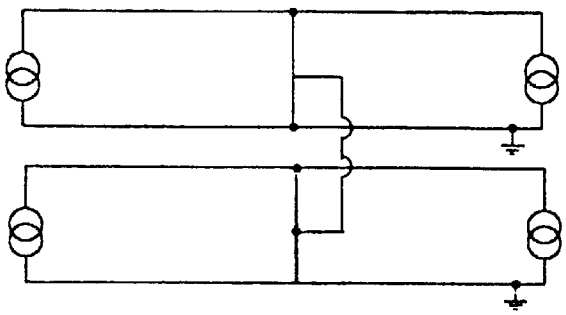
Figure 5C:
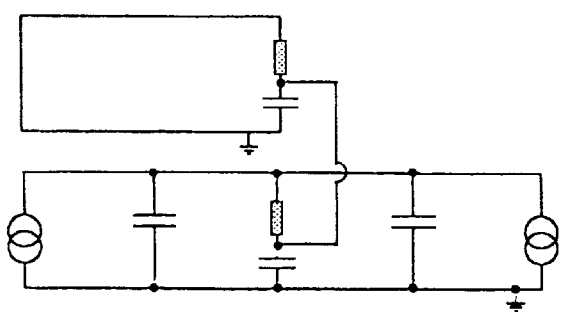
Figure 6:
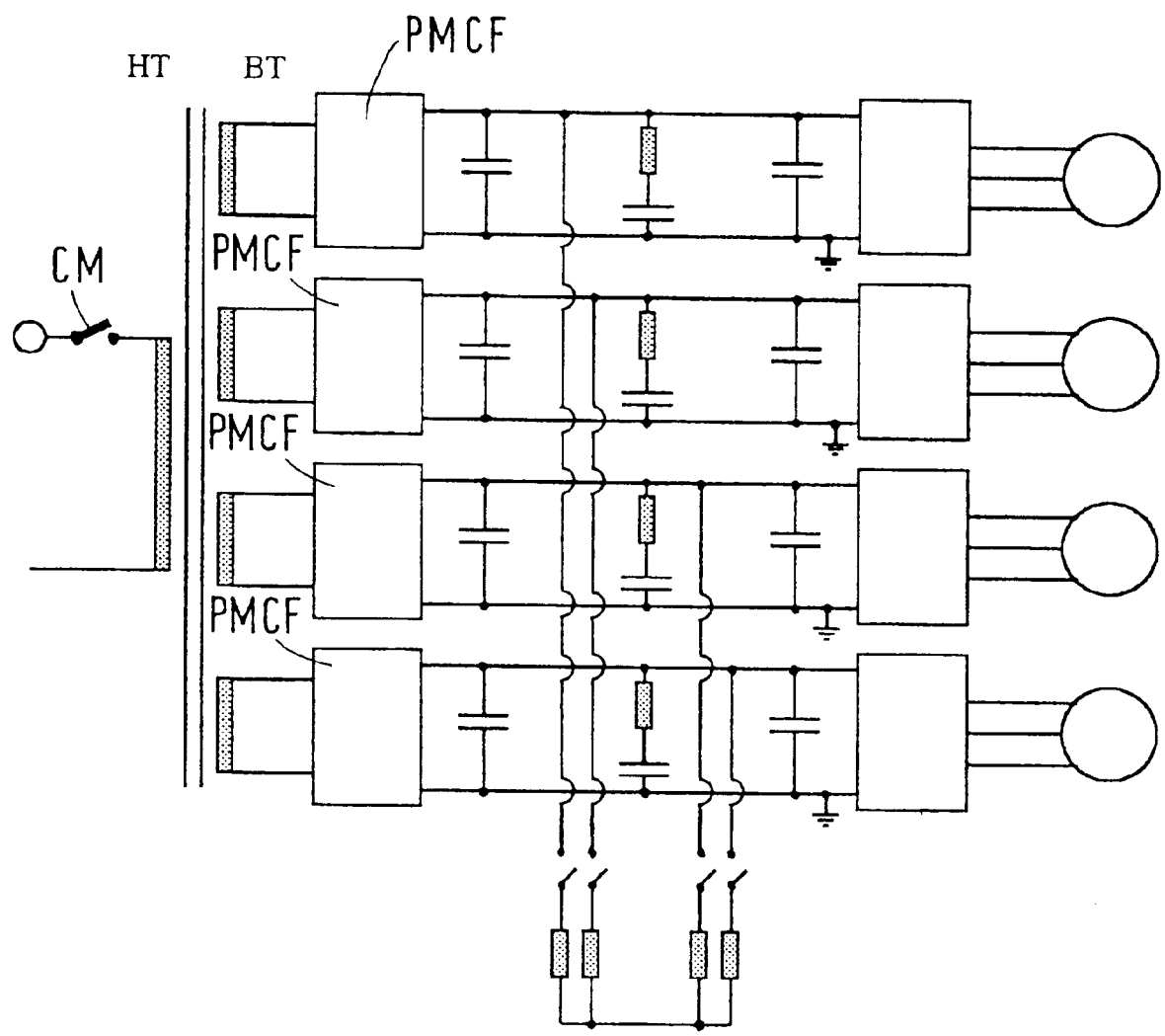
FIG. 6 is an electrical layout of another preferred embodiment of an electric traction system including of the semi-common buses type in accordance with the invention.

FIGS. 5A to 5C show the equivalent diagrams of the electrical layout of FIG. 5, in the case, respectively, of direct currents, of 2F currents and of a short-circuit of the higher bus, FIG. 6 is an electrical layout of another preferred embodiment of an electric traction system including buses of the semi-common buses type in accordance with the invention.

In accordance with this other preferred embodiment of the electric traction system in accordance with the invention, the power supply buses are linked directly by means of self-inductive elements.

Figure 7:
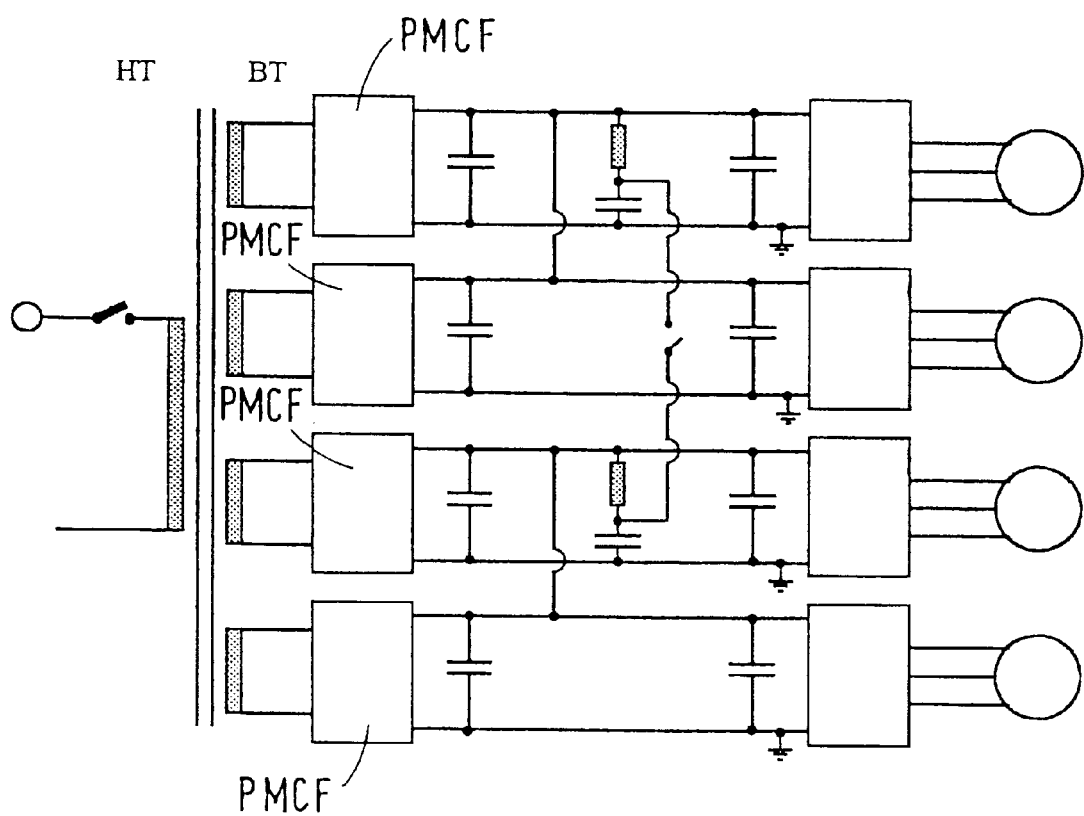
FIG. 7 is an electrical layout of another preferred embodiment of an electric traction system including buses of the semi-common buses type in accordance with the invention.

FIG. 7 is an electrical layout of another preferred embodiment of an electric traction system including buses of the semi-common buses type in accordance with the invention.

In accordance with this other preferred embodiment of the electric traction system in accordance with the invention, the first half of the power supply buses each includes a 2F filter, the other half of the power supply buses is linked in pairs to the first half of the power supply buses and the mid-points of the 2F filters of the first half of the power supply buses are linked together.

SIMULATIONS

The simulations defined below are carried out on four types of electrical power layout of an electric traction system of the prior art, including buses with the following bus type Configuration of the Traction Systems Option 1 According to the Prior Art:

Four-bus traction system, each bus including a PMCF and a 2F filter (FIG. 1).

Option 2 According to the Prior Art:

Four-bus traction system, each bus including a PMCF and a 2F filter, the buses being configured in pairs in such a way that each pair of buses is associated with two PMCFs (FIG. 2).

Option 3 According to the Prior Art:

Four-bus traction system, each bus including a PMCF, only one of the buses including a 2F filter, the buses being configured in such a way that the set of buses are associated with 4 PMCFs (FIG. 3).

Option 4 In Accordance with the Invention:

Four-bus traction system, each bus including a PMCF and a 2F filter, the 2F filters being configured in such a way that the mid-points of the filters 2F of the set of power supply buses are linked together (FIG. 4).

Results of the Simulation in the Case where Slight Dispersions Exist between the Buses Table 2 below indicates the results of the simulation for limited dispersions between the DC buses.

TABLE 2

Figure 1A:
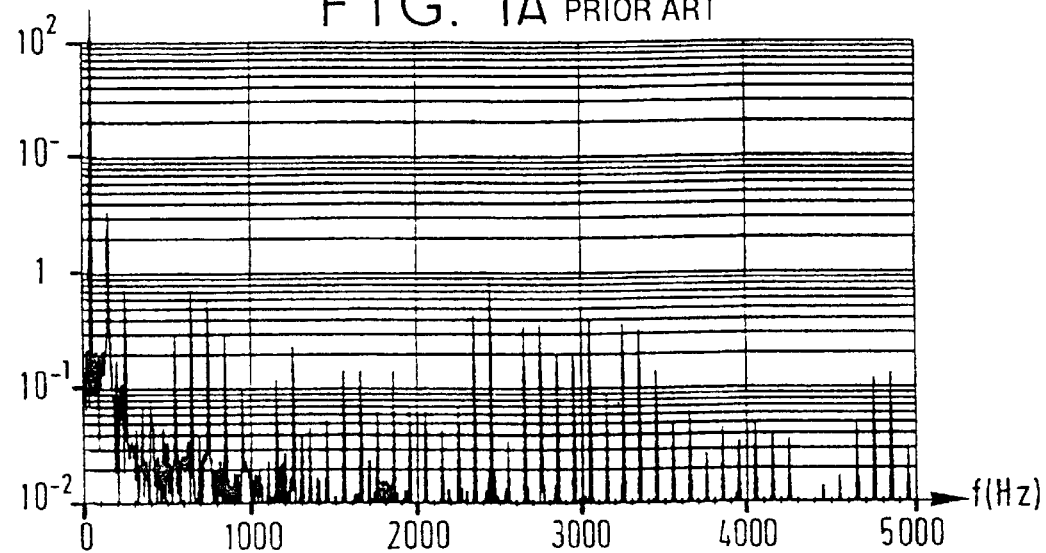
Figure 1B:
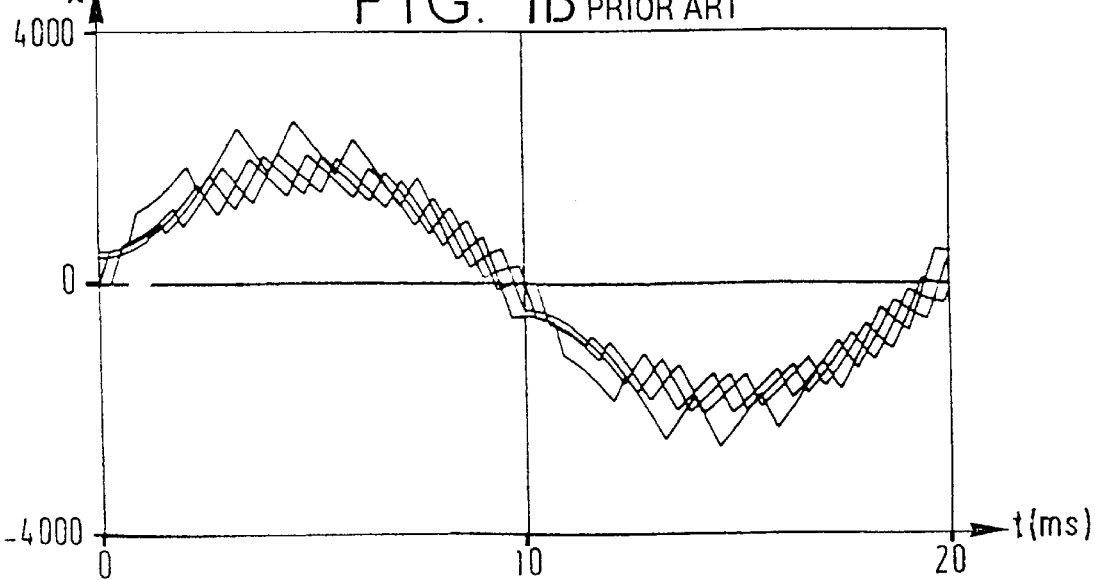
Figure 2A:
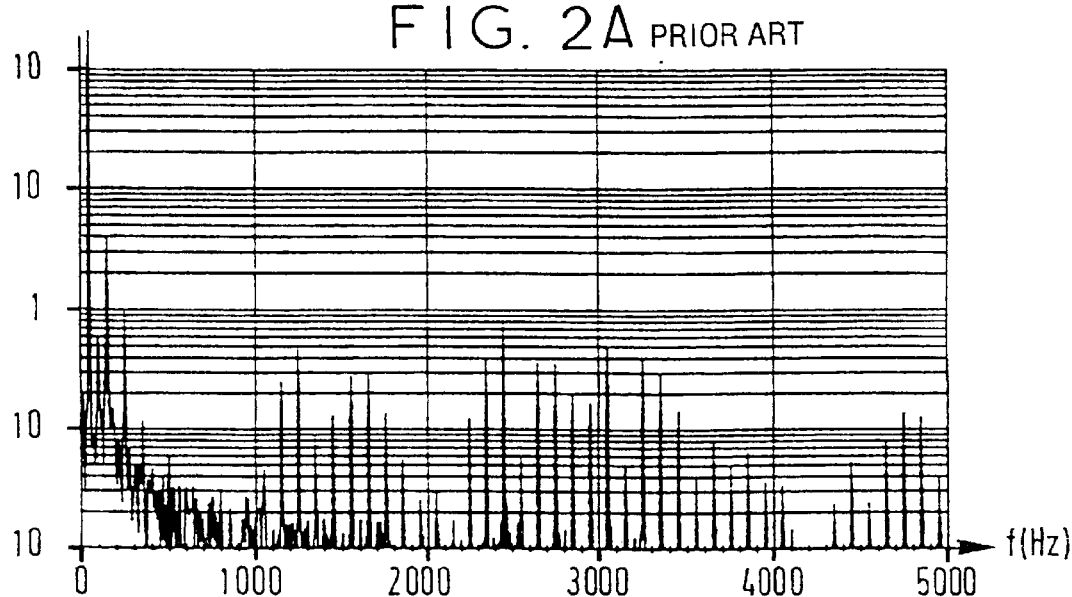
Figure 2B:
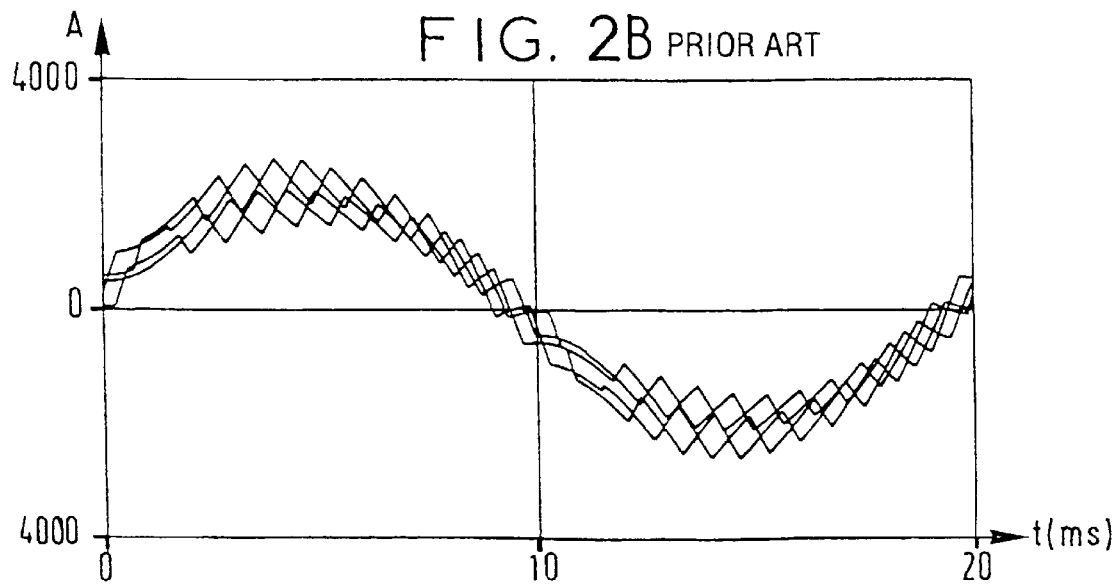

|  | OPTION 1 | OPTION 2 | OPTION 3 | OPTION 4 |
| --- | --- | --- | --- | --- |
| Number of buses | 4 | 2 | 1 | — |
| Number of PMCFs and of inverters per bus | 1 | 2 | 4 | — |
| Number of interlaced PMCFs | 4 | 4 | 4 | — |
| Value of the Uc dispersion on bus 1 | 10% | 10% | 0% | — |
| Value of the power dispersion on bus 1 | 10% | 10% | 0% | — |
| Value of the primary current IPE | poor | average | good | — |
| Spectrum of the primary current IPE | FIG. 1A | FIG. 2A | FIG. 3A | — |
| Curves of the four secondary currents | FIG. 1B | FIG. 2B | FIG. 3B | — |

The comparison of the levels of harmonics for small dispersions due to an error in measurement of Uc or in the control of the inverters shows that an imbalance of the order of 10% of Uc and of the power on a bus gives rise to:
- a first family of spectral lines and 58% increase in the value of the primary current IPE, in the case of four separate buses each consisting of one PMCF,
- a second family of spectral lines and 35% increase in the value of the primary current IPE, in the case of two separate buses each consisting of two PMCFs.

The results appear acceptable for the separate buses, provided that the catenary is perfect.

However, if the locomotive is far from the substation under a catenary, the harmonics and the IPE of the current risk being substantially degraded.

Results of the Simulation in the Case where a Significant Imbalance Exists between the Buses Table 3 below indicates the results of the simulation for a significant difference in power between inverters.

TABLE 3

Figure 1C:
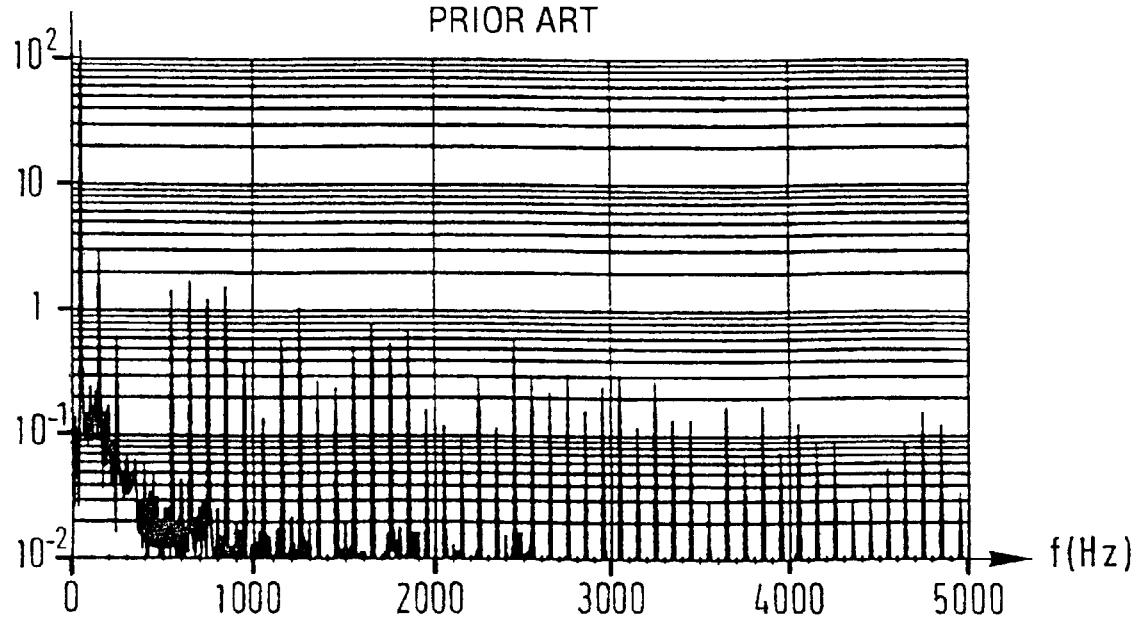
Figure 1D:
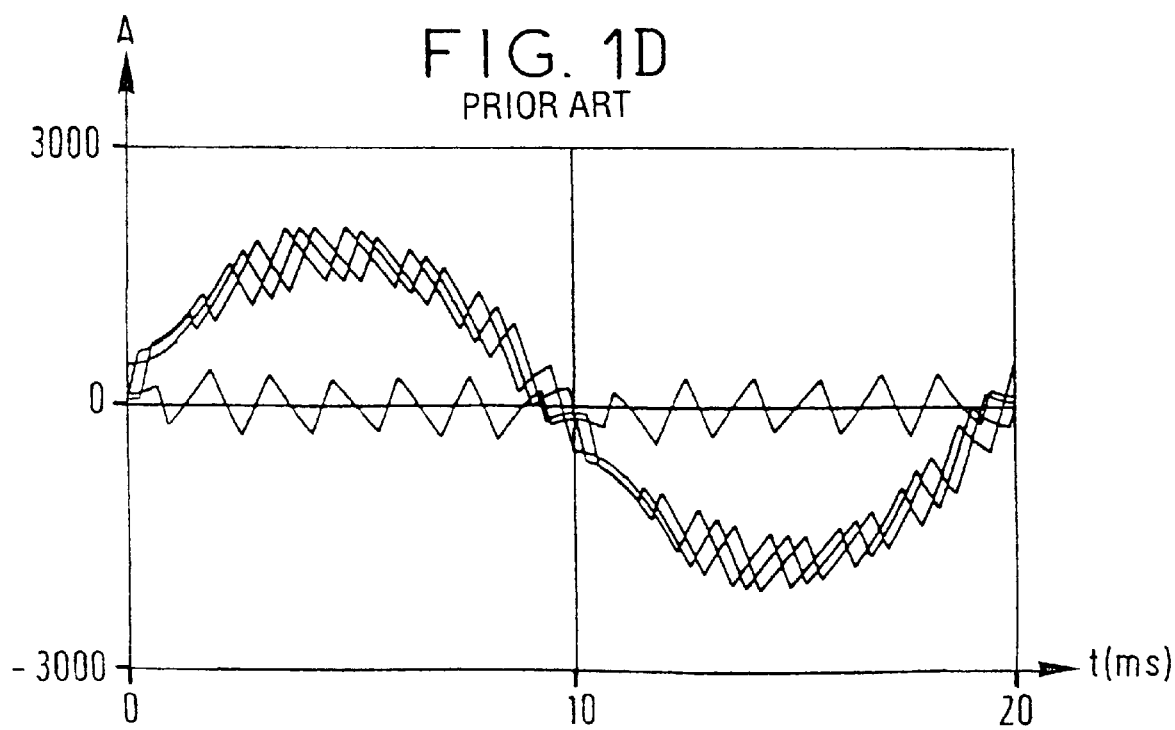
Figure 2C:
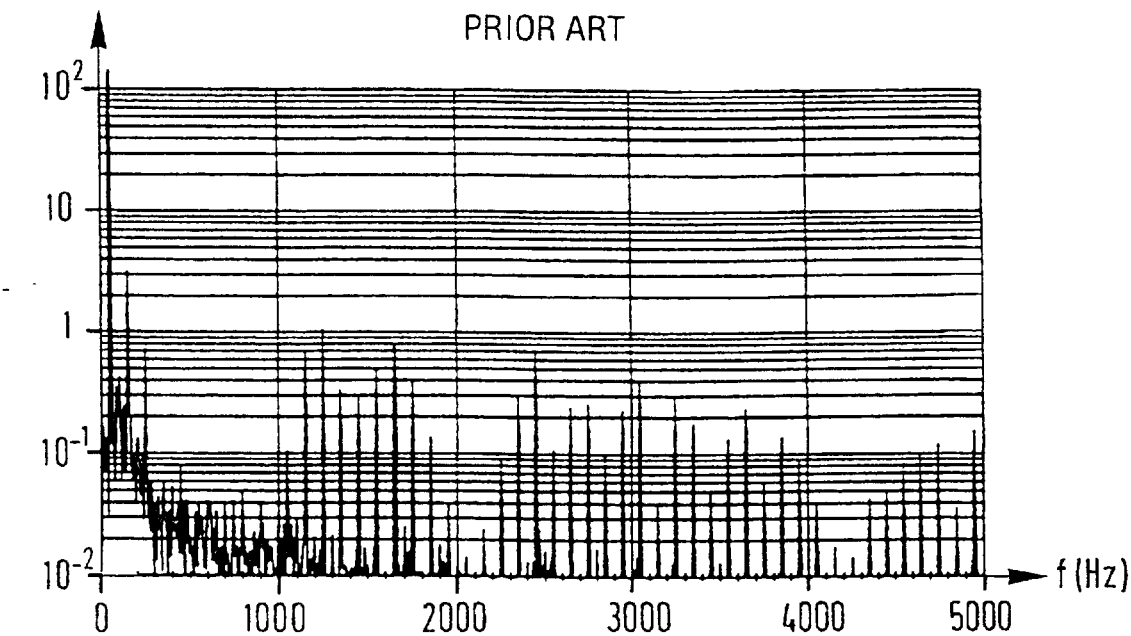
Figure 2D:
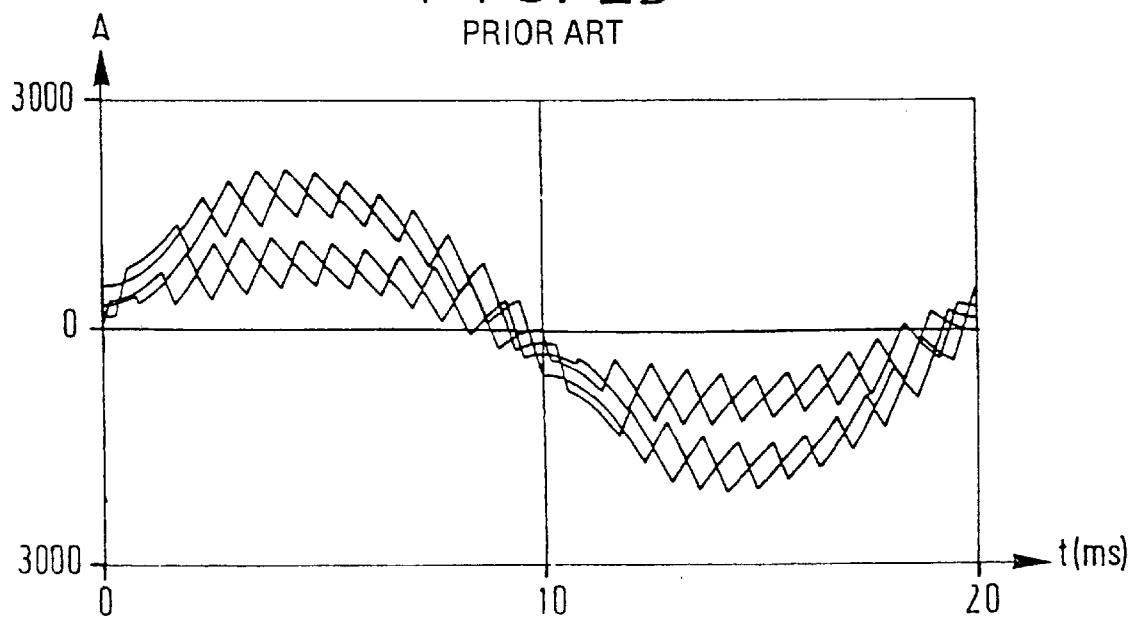

|  | OPTION 1 | OPTION 2 | OPTION 3 | OPTION 4 |
| --- | --- | --- | --- | --- |
| Number of buses | 4 | 2 | — | 1 |
| Number of PMCFs and of inverters per bus | 1 | 2 | — | 4 |
| Number of interlaced PMCFs | 4 | 4 | — | 4 |
| Value of the Uc dispersion on bus 1 | 0% | 0% | — | 0 |
| Value of the power dispersion on bus 1 | 100% | 50% | — | 0 |
| Value of the primary current IPE | poor | average | — | good |
| Spectrum of the primary current IPE | FIG. 1C | FIG. 2C | — | FIG. 4A |
| Curves of the four secondary currents | FIG. 1D | FIG. 2D | — | FIG. 4B |

In the case in which the difference in power is significant between the separate buses, the harmonics and the IPE can no longer be assured.

As to option 1, if the inverter on bus 1 is cut off (hypothetical case), the IPE can reach four times more than normal.

As to option 2, if the inverter on bus 1 is cut off, the IPE can reach twice the normal.

This type of situation may possibly occur when the power of the auxiliary unit linked to the DC traction buses is significant.

Option 4 in accordance with the invention, called separate-common bus layout, shows identical performance to the layout with common buses.

FIG. 5 is an electrical layout of another preferred embodiment of the electric traction system including two buses of the semi-common buses type in accordance with the invention.

FIGS. 5A to 5C show, respectively, the equivalent diagrams of the electrical layout of FIG. 5, in the case of DC currents, of 2F currents and of a short circuit of the upper bus.

The electrical layout of the electric traction system including two buses of the semi-common buses type in accordance with the invention includes a link between the individual buses via inductors.

In accordance with the first preferred embodiment of the electrical layout of an electric traction system including buses of the semi-common buses type in accordance with the invention, the electric traction system includes a link between the 2F filters (FIG. 4).

The advantage of this first preferred embodiment of the electrical layout is of preserving the advantages of the separate buses, as well as the advantages of the common buses without adding significant amounts of equipment.

In the case of steady-state operation of the electric traction system in accordance with the invention, the linking of the 2F filters allows energy to pass between the buses, and imposes uniformity of the DC voltages, Uc.

The currents of the PMCFs are therefore made uniform, the advantage of the electric traction system with common buses is thus preserved.

In the case of a short circuit of a DC bus, the supply of energy from the other buses passes through the 2F inductors.

The advantage of the electric traction system with separate buses is thus preserved.

In order to avoid overcurrents in the event of a short circuit of the DC bus, the choice of the layout with continuous-separate bus degrades the performance of the harmonics and of the IPE because of the dispersion of the voltages Uc and loads.

However, because of the appearance of low-order harmonics, the degradation risks becoming aggravated in the event of resonance of the catenary.

The applicant also has the merit of proposing a power layout, called a common-buses layout, based on the layout known as separate-buses layout, the particular feature of this layout being that of placing the 2F capacitors in common on all the buses.

The simulation results thus show that the power layout with semi-common buses in accordance with the invention exhibits the same harmonics and the same value of the IPE as those exhibited by the common-buses layout of the prior art, while preserving the advantages of the separate-buses power layout of the prior art as far as the transient states are concerned.

What is claimed is:

1. Traction system in voltage mode including power supply buses of an electric traction vehicle, in which each bus of at least a part of the said power supply buses includes a 2F filter, characterized in that the mid-points of the said 2F filters of the said power supply buses are linked together.

2. Traction system in voltage mode according to claim 1, characterized in that the said part constitutes a first half of the said power supply buses, the other half of the said power supply buses being linked in pairs to the said first half of the said power supply buses.

* * * * *